United States Patent [19]

Schneider

[11] Patent Number: 5,025,753
[45] Date of Patent: Jun. 25, 1991

[54] FLEXIBLE BIRD FEEDER

[76] Inventor: Paul Schneider, 2604 N. Huebner, Oconomowoc, Wis. 53066

[21] Appl. No.: 535,463

[22] Filed: Jun. 8, 1990

[51] Int. Cl.⁵ .............................................. A01K 39/00
[52] U.S. Cl. .................................... 119/51.03; 119/57.8
[58] Field of Search ..................... 119/18, 51.3, 52.2, 119/57.8

[56] References Cited

U.S. PATENT DOCUMENTS 4,026,244  5/1977  Salick ............................ 119/57.8
4,706,851  11/1987  Hegedus et al. .................. 119/52.2

Primary Examiner—John G. Weiss
Attorney, Agent, or Firm—Foley & Lardner

[57] ABSTRACT

A fresh food product bird feeder formed from two sheet of plastic material, each sheet having an opening in the center and a hole located below the opening. The sheets are connected together at their ends so that the sheets can be spread apart to align a food product such as an orange with the holes and clamped therein by the inherent bias of the plastic material.

10 Claims, 2 Drawing Sheets

FLEXIBLE BIRD FEEDER

FIELD OF THE INVENTION

The present invention relates to a bird feeder and more particularly to a flexible type feeder for holding fresh fruit or the like in a position accessible to birds.

BACKGROUND OF THE INVENTION

Birds, like any other wild animal, have certain likes and dislikes with respect to food items. Typically, Orioles have an affinity for oranges while various other types of birds have affinity for various other types of fresh fruit and/or vegetables. Typically, bird feeders are generally made of wood. In this regard, the most common type of fruit feeder is made of a rectangular piece of wood having a hole located in the center of the board with a piece of fresh fruit, such as an orange, pushed into the hole, a dowel or pin is used to hold the fruit in the hole. The dowel is inserted through the hole edgewise from the top to the bottom of the feeder to puncture the orange to hold it in place. As the fruit is picked apart by the bird, the smaller pieces will fall on the ground.

A simpler type of feeder consists of a board having a dowel extending upward from the board. The fruit is merely pressed onto the dowel to hold it in position. The board provides the surface on which the birds can stand to feed on the fresh fruit. Generally, however, as the fruit is picked apart it will be scattered over the board and the surrounding environment.

SUMMARY OF THE INVENTION

The flexible bird feeder according to the present invention is formed from a pair of flexible sheets of plastic material which are connected at their upper and lower ends. A hole is provided in both sheets of material in a coaxial relationship intermediate the ends of the flexible sheets. The sheets are then pulled apart and an orange inserted between the sheets in a position to protrude slightly from the holes provided in each of the sheets. The inherent bias of the sheets will clamp the orange into the holes. A perch is provided on the sheets beneath the orange for supporting birds in a position to feed on the orange. A second pair of holes is provided in the top of the flexible sheets for hanging the feeder on a branch or overhead support.

A principle feature of the present invention is the simplicity of the bird feeder in securely holding the orange in position.

Another feature of the invention is the use of the inherent bias of the feeder sheets to firmly hold the orange while the birds are feeding.

A principle advantage of the invention is the ability to quickly and easily clean the feeder after each use.

Other principal features and advantages of the invention will become apparent to those skilled in the art upon review of the following drawings, the detailed description and the appended claims.

DETAILED DESCRIPTION OF THE DRAWINGS

Figure 1:
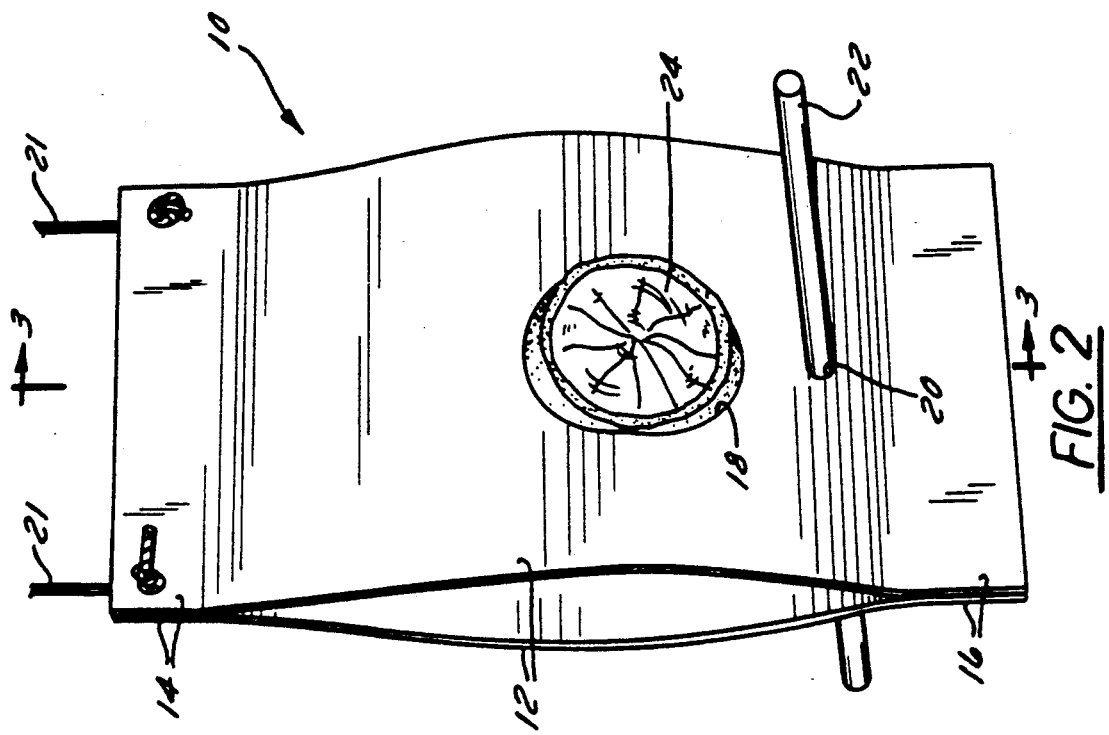
FIG. 1 is a perspective view of the flexible bird feeder shown in the collapsed position.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENT

The flexible bird feeder 10 according to the invention generally includes a pair of flexible plastic sheets 12 which are connected at their upper and lower ends 14 and 16, respectively. The ends of the sheets being connected by means of a permanent type of adhesive or heat sealed. The adhesive is preferred because of ease of handling and permanence of the seal. Each plastic sheet includes a circular opening 18 in or near the center of the sheets, a pair of holes 19 at the top and a hole 20 below the opening 18. The openings 18 are coaxially located in the sheets 12 and have a diameter approximately half the diameter of an orange. The holes 20 provide a support for a dowel 22.

Figure 2:
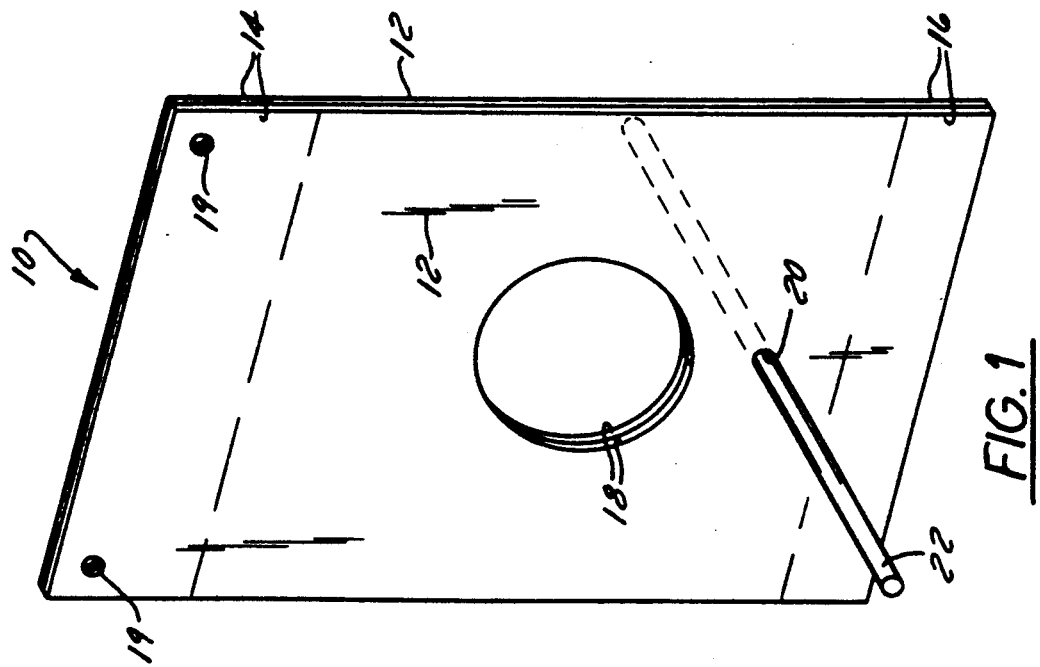
FIG. 2 is a perspective view of the feeder expanded to clamp an orange between the sheets of the feeder.
Figure 3:
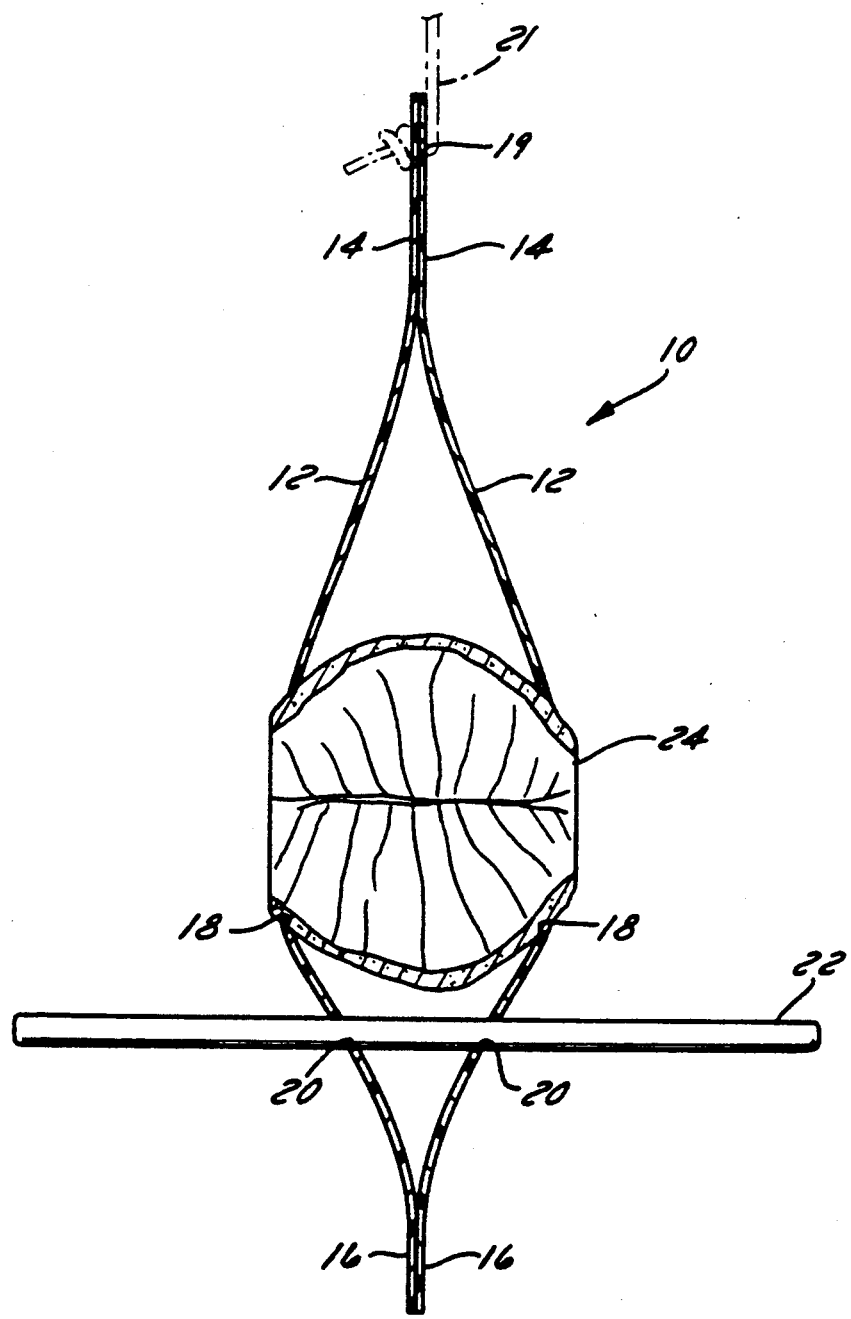
FIG. 3 is a side elevation view in section taken on line 3—3 of FIG. 2, showing a cross section of the feeder with an orange supported in the holes in the sheets.

Referring to FIGS. 2 and 3 an orange 24 is shown supported in the openings 18 between the sheets 12 The orange is mounted in the sheets by spreading the sheets apart far enough for the orange to be aligned in the openings 18. The ends of the orange should be cut off in close proximity to the sheets as shown in the drawings. The sheets 12 are then released so that the orange is trapped or clamped between the sheets.

Means are provided for supporting birds in an accessible position to the orange. Such means can be in the form of a dowel 22 which is used to provide a perch for the birds to feed on the open ends of the orange. It should be noted that the stability of the dowel is enhanced by spreading the sheets to support the orange. Referring to FIG. 3, it should be noted that the sheets are spread along the dowel 22 which reduces the length of the exposed portion of dowel.

The sheets 12 are formed from a material such as polyvinyl plastic 20 to 30 thousandths inches thick. It is very important to have the flexible material made of plastic which makes it easy to expand the plastic sheets sufficiently to insert the orange into the openings 18. The inherent bias of the plastic sheets will hold the orange in a fixed position. The ends of the sheets may be heat-sealed together or simply connected by a permanent adhesive.

Means are also provided for hanging the feeder on an overhead support. Such means can be in the form of cords 21 which are knotted on the ends and inserted through the holes 19 for hanging on a limb or other location. As noted above, one of the advantages of the feeder is the ability to clean the plastic sheets after each use. It should also be noted that as the orange is eaten, most of the scrap will remain locked between the sheets and will not drop on the surrounding environment.

Thus, it should be apparent that there has been provided in accordance with the present invention a flexible bird feeder that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privelege is claimed are defined as follows:

1. A bird feeder for supporting a whole fresh food product in an accessible position for feeding birds, said feeder comprising:

a pair of flexible sheets having upper and lower ends and sides, a hole in each of said sheets intermediate the ends for supporting one end of a whole fresh food product, means for permanently connecting the ends of said sheets with the holes located in a coaxial relation, said sheets being spread apart to insert from the sides and maintain the position of the whole fresh food product in the holes between said sheets, and means mounted on said sheets for supporting a bird in position to feed on the whole fresh food product.

2. The feeder according to claim 1, wherein said sheets are made of a plastic material.

3. The feeder according to claim 1, wherein said support means comprises a dowel mounted in said sheets below said hole.

4. The feeder according to claim 1 including means at the upper end of each sheet for hanging said sheet in a generally vertical position.

5. A whole fresh food product type bird feeder comprising:

a pair of flexible plastic sheets of a predetermined length and width, an opening in each sheet of a predetermined diameter for supporting one end of a whole fresh food product, and means for permanently securing said sheets together on each side of said openings, whereby said sheets can be spread apart between said securing means to support and maintain the position of the whole fresh food product between said openings.

6. The feeder according to claim 5 including means mounted on said sheets for supporting a bird in an accessible position to said product.

7. The feeder according to claim 6 including means for hanging said feeder on an overhanging structure.

8. The feeder according to claim 6 wherein said supporting means is a dowel mounted on said sheets below said openings.

9. The feeder according to claim 5 wherein the inherent bias of said flexible plastic sheets is sufficient to retain the food product in said holes.

10. The feeder according to claim 9 wherein said holes have a diameter which is smaller than said product.

* * * * *